United States Patent
Huang et al.

(10) Patent No.: US 7,150,072 B2
(45) Date of Patent: Dec. 19, 2006

(54) HINGE ASSEMBLY

(75) Inventors: Qing Ming Huang, Shenzhen (CN); Shui Yuan Qin, Shenzhen (CN); Chia-Hua Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/858,769

(22) Filed: Jun. 1, 2004

(65) Prior Publication Data

US 2004/0237259 A1 Dec. 2, 2004

(30) Foreign Application Priority Data

May 30, 2003 (TW) ............... 92210064 U

(51) Int. Cl.
*E05D 11/10* (2006.01)

(52) U.S. Cl. .................................. 16/312; 16/330

(58) Field of Classification Search .............. 16/235, 16/239, 250, 263, 277, 284, 285, 312, 315, 16/330, 342, 352, 303; 455/90, 550, 556, 455/575; 379/433.11–13, 434, 433; 403/119, 403/120, 109.5, 111
See application file for complete search history.

(56) References Cited

U.S. PATENT DOCUMENTS

| | | | | |
|---|---|---|---|---|
| 5,628,089 A | * | 5/1997 | Wilcox et al. ............... | 16/303 |
| 5,697,124 A | * | 12/1997 | Jung ........................... | 16/341 |
| 5,930,353 A | * | 7/1999 | Lee et al. ............... | 379/433.05 |
| 5,996,178 A | * | 12/1999 | Murray ....................... | 16/303 |
| 6,085,387 A | | 7/2000 | Han | |
| 6,115,886 A | * | 9/2000 | Fujita ......................... | 16/330 |
| 6,292,980 B1 | * | 9/2001 | Yi et al. ..................... | 16/303 |
| 6,305,050 B1 | * | 10/2001 | Imai ........................... | 16/303 |
| 6,320,961 B1 | * | 11/2001 | Hayasaka .............. | 379/433.13 |
| 6,321,415 B1 | * | 11/2001 | Frohlund ..................... | 16/330 |
| 6,530,121 B1 | * | 3/2003 | Hayashi ...................... | 16/330 |
| 6,633,643 B1 | * | 10/2003 | Ona ...................... | 379/433.13 |
| 6,772,481 B1 | * | 8/2004 | Oshima et al. ............... | 16/330 |
| 6,808,402 B1 | * | 10/2004 | Ryu et al. ................... | 439/165 |
| 6,832,411 B1 | * | 12/2004 | Koshikawa et al. .......... | 16/330 |
| 6,913,125 B1 | * | 7/2005 | Hayashi ..................... | 188/290 |
| 2004/0020012 A1 | * | 2/2004 | Gupte ......................... | 16/303 |
| 2004/0025297 A1 | * | 2/2004 | Koshikawa et al. .......... | 16/277 |
| 2004/0216275 A1 | * | 11/2004 | Hayashi ...................... | 16/303 |

FOREIGN PATENT DOCUMENTS

JP 05-263563 * 10/1993

* cited by examiner

*Primary Examiner*—Robert J. Sandy
*Assistant Examiner*—Andre' L. Jackson
(74) *Attorney, Agent, or Firm*—Wei Te Chung

(57) ABSTRACT

A hinge assembly includes a housing (1) encasing a spring (2), a cam follower (3), a cam member (4) and a washer (5) therein. The cam follower has a shaft (31), and a pair of tabs (32) perpendicularly formed on the shaft. The spring is coiled over the shaft, and is compressively engaged in the housing. The tabs of the cam follower slide in grooves (13) of the housing. The cam member includes a cam portion (43) and a connector (41). The cam portion forms a pair of peaks (46) and a pair of valleys (44), being engaged with the tabs of the cam follower. The connector extends outside of the housing. The washer is rotatably inserted over the connector, and is fitted in the housing for fixing the hinge components in the housing.

6 Claims, 4 Drawing Sheets

HINGE ASSEMBLY

BACKGROUND OF THE INVENTION

1. Field of the Invention

The present invention relates to an apparatus for hinging together the housings of foldable devices, and particularly to an apparatus for hinging together the housings of a foldable mobile phone.

2. Description of Related Art

Portable radiotelephones having two housings joined by a type of hinge that allows the housings to fold upon one another are known in the art. Some such folding radiotelephones have most of the electronics in one housing, called the main housing, and fewer electronics in the other housing, called the cover. Other such folding radiotelephones have all the electronics in the body, with the cover serving only to cover the keypad or the keypad and the display of the radiophone. Manufacturers have tried to reduce the volume, size and weight of the portable radiotelephone. Thus, it is desirable that the hinge coupling the main housing with the cover is modularized and miniaturized. The modularized hinge device is required to have the structure for holding moving parts of the hinge, such as a cam member, a cam follower and a spring. For miniaturization, the size and the number of parts of the hinge should be reduced.

Such a hinge assembly is disclosed in U.S. Pat. No. 6,085,387, as shown in FIG. 5. The hinge assembly has a can 21, a first hinge member 22, a second hinge member 23 and a spring 24. The first hinge member 22, the second hinge member 23 and the spring 24 are inserted into the can 21 with an open end 217 of the can 21 being partially covered by way of bending protrusions 213 of the can 21. The first hinge member 22 is inserted through the open end 217 of the can 21, with a shaft 222 of the first hinge member 22 extending through a hole 211 of the can 21. The second hinge member 23 is inserted trough the open end 217 of the can 21 so that two protrusions 223 of the first hinge member 22 can be engaged with peaks 235 and valleys 236 of a earn portion 233 of the second hinge member 23, and a cylindrical guide column 234 is located between the two protrusions 223 for guiding the relative motion between the first and second hinge members 22, 23. The spring 24 exerts the elastic force on the second hinge member 23 to push the second hinge member 23 toward the first hinge member 22. However, the cylindrical guide column 234 may deviate from the rotating axis during rotation, so that the second hinge member 23 cannot smoothly and stably move relative to the first hinge member 22. Furthermore, it is hard to keep the spring 24 moving longitudinally, since there is no longitudinal support or guide member for fixing the spring 24. Thus the spring 24 can be easily damaged, and the second hinge member 23 cannot smoothly and stably move relative to the first hinge member 22.

Therefore, an improved hinge assembly which overcomes the disadvantages of the prior art is desired.

SUMMARY OF THE INVENTION

A main object of the present invention is to provide a hinge assembly having a reduced size.

Another object of the present invention is to provide a hinge assembly, wherein a relative motion between a cam member and a cam follower thereof is smooth and stable.

A hinge assembly comprises a housing encasing a spring, a cam follower, a cam member, and a washer therein. The cam follower has a shaft, and at least one tab perpendicularly formed on the shaft. The spring is coiled over the shaft, and is compressively engaged in the housing. The cam member includes a cam portion and a connector. The cam portion forms at least one peak and one valley, being engaged with the tab of the cam follower while the tab of the cam follower slides in a groove of the housing. The connector extends outside of the housing. The washer is rotatably inserted over the connector, and is fitted in the housing for fixing the hinge components therein.

Other objects, advantages and novel features of the invention will become more apparent from the following detailed description of a preferred embodiment thereof when taken in conjunction with the accompanying drawings, wherein:

DETAILED DESCRIPTION OF THE INVENTION

Figure 1:
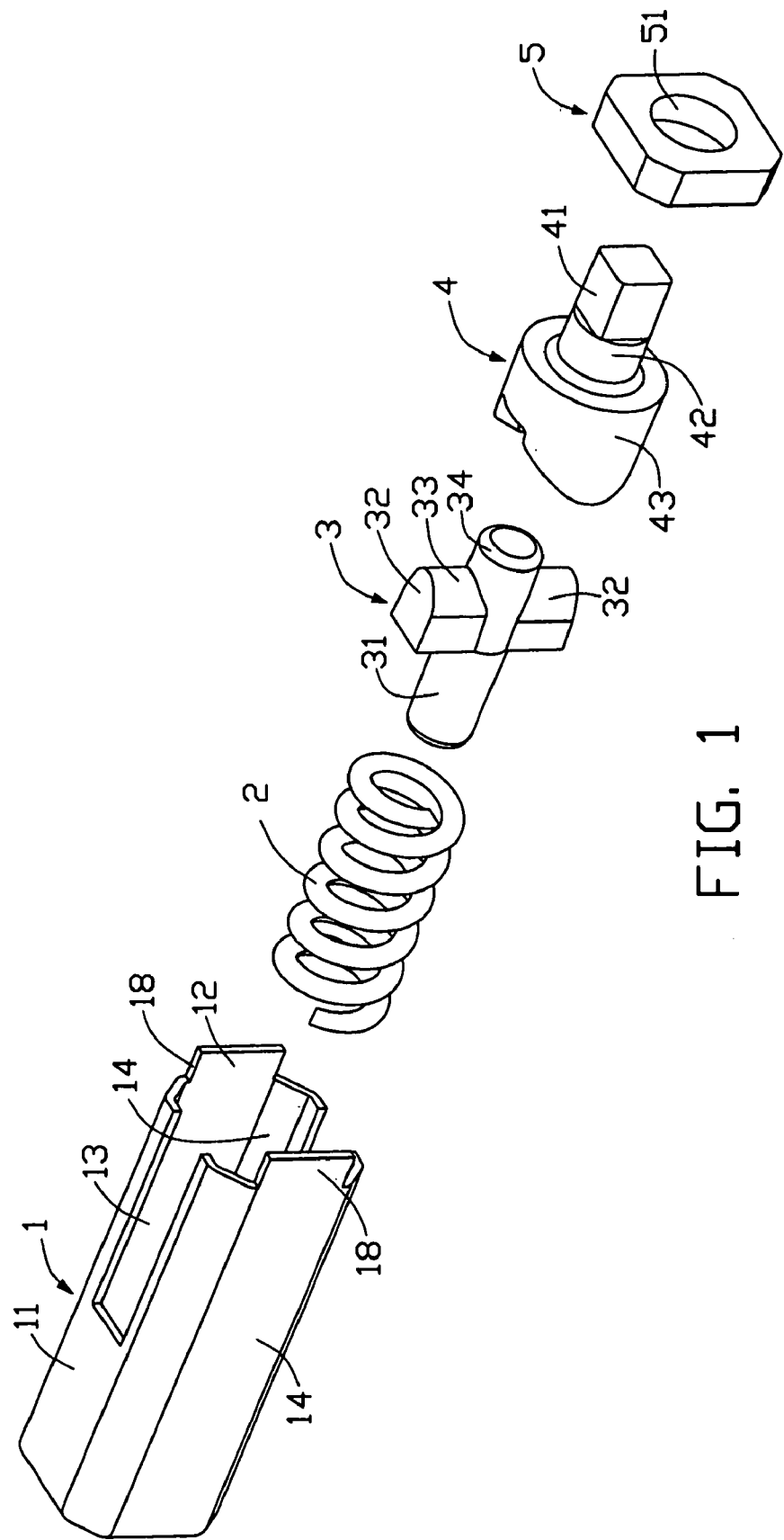
FIG. 1 is an exploded, perspective view of a hinge assembly in accordance with an embodiment of the present invention.

Referring now to the drawings in detail, FIG. 1 shows a hinge assembly. The hinge assembly comprises a can 1, a spring 2, a cam follower 3, a cam member 4, and a washer 5.

The can 1 has an elongated octagonal shapes which is sealed at a rear end thereof and is open at a front end thereof, thus forming an open end 12. Two opposite top and bottom walls 11 of the can each define an axially extending groove 13. Two opposite sidewalls 14 of the can 1 each form a retaining protrusion 18 extending axially at the open end 12 of the can 1.

The spring 2 is made of metal and is spiral-shaped.

The cam follower 3 is cross-shaped, and includes a shaft 31. Two tabs 32 are perpendicularly formed on the shaft 31, leaving a front end 34 of the shaft 31 extending therebetween. The two tabs 32 are located 180 degrees from one another on the surface of the shaft 31, and each of the tabs 32 has an engaging surface 33, preferably an arcuate smooth surface.

Figure 2:
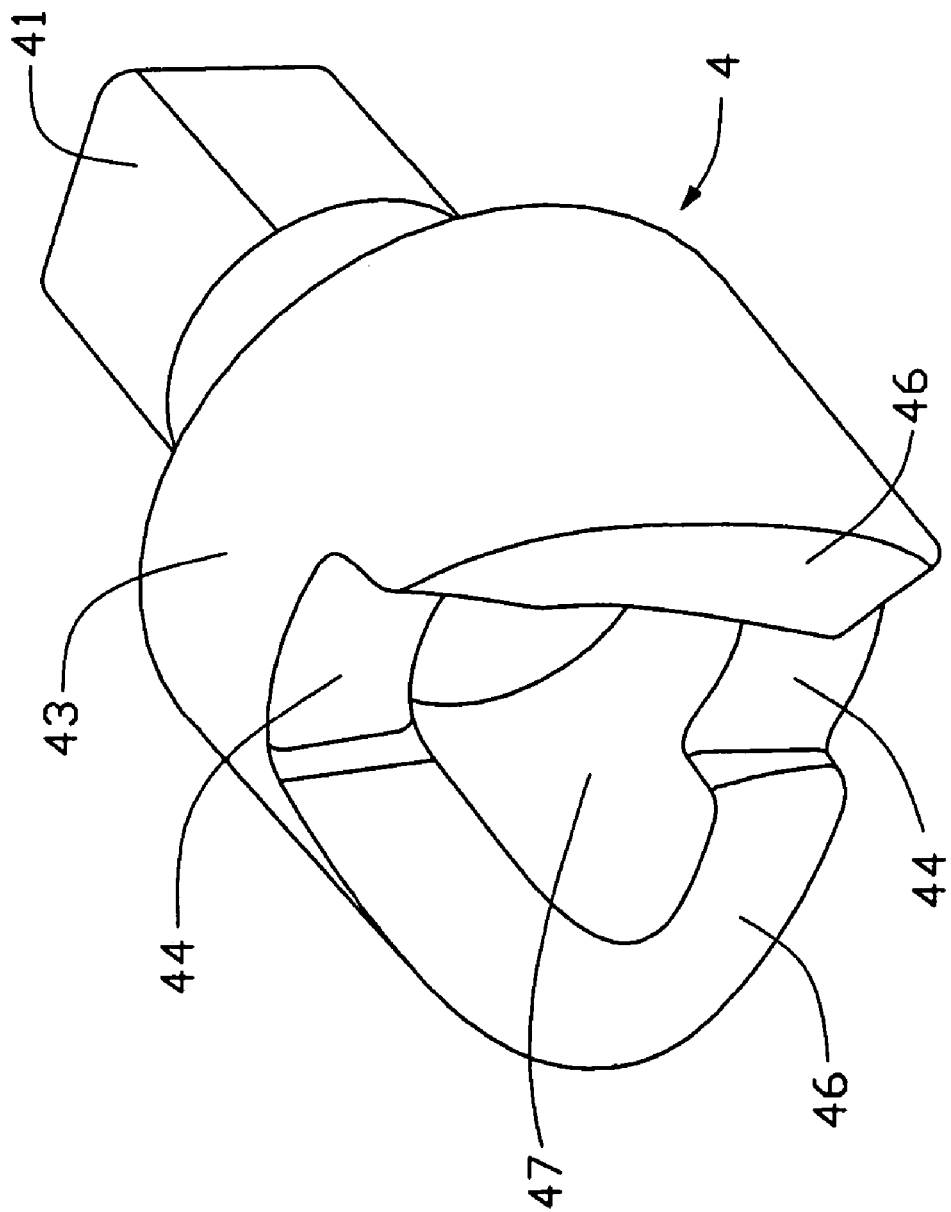
FIG. 2 is a perspective view of a cam member of FIG. 1.
Figure 3:
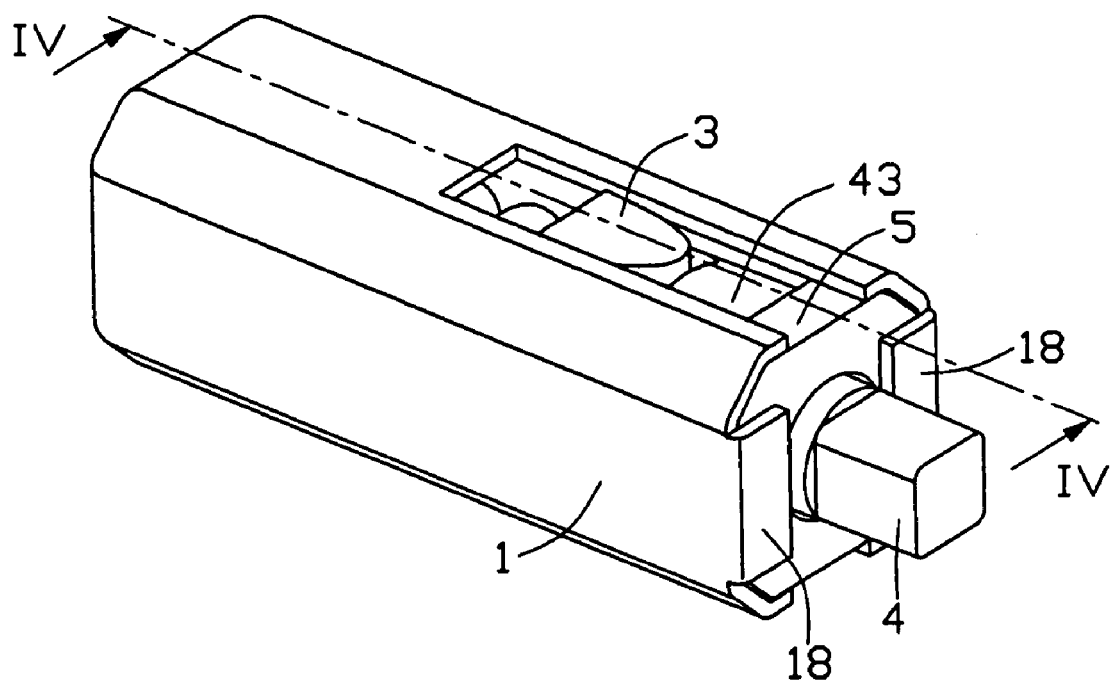
FIG. 3 is an assembled, perspective view of the hinge assembly of FIG. 1.
Figure 4:
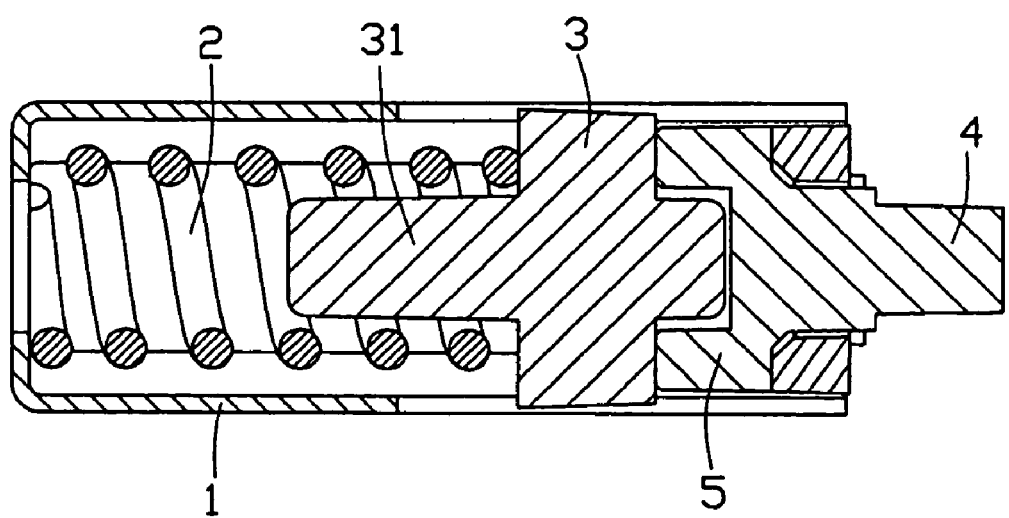
FIG. 4 is a cross-sectional view taken along line IV–IV of FIG. 3.
Figure 5:
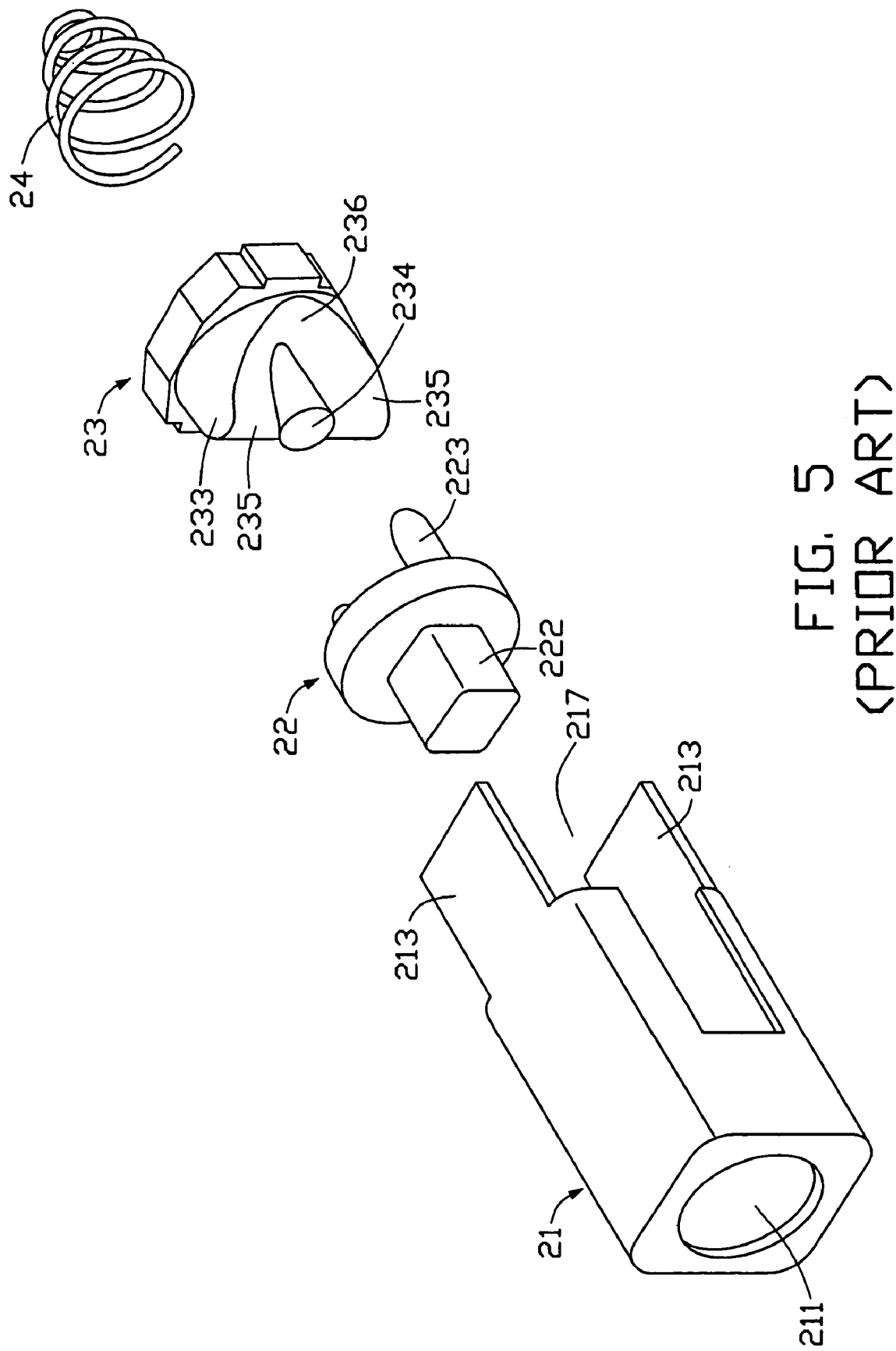
FIG. 5 is an exploded, perspective view of a hinge assembly of the prior art.

Referring also to FIG. 2, the cam member 4 includes a cylindrical cam portion 43, and a connector 41 extending from a flat front surface (not labeled) of the cam portion 43. A circular groove 42 is defined on the connector 41 adjacent to the flat front surface of the cam portion 43. The connector 41 has a polygonal shape at a front end thereof so that it can be tightly fixed in a main body of a folding mobile phone. The cylindrical cam portion 43 defines a hole 47 therethrough, and has a cam surface forming a plurality of peaks 46 and a plurality of valleys 44, preferably with two peaks located 180 degrees from one another and two valleys located 180 degrees from one another. The shaft 31 of the follower 3 can be received in the hole 47 of the cam portion 43, and the tabs 32 can be engaged with the cam surface so that the tabs 32 are received in the valleys 44.

The washer 5 has an octagonal shape corresponding to the inside of the can 1, and defines a hole 51 therethrough for engaging of the washer 5 at the circular groove 42 of the connector 41.

Referring to FIGS. 1–4, in assembly, first, the spring 2 is placed over the shaft 31 of the cam follower 3 and coupled to rear surfaces (not labeled) of the tabs 32 opposite to the engaging surfaces 33 thereof. The cam follower 3 is then inserted into the can 1 through the open end 12 thereof, with the tabs 32 being slidably inserted into the grooves 13 of the can 1 (see FIGS. 3 and 4). Thus the spring 2 is engaged against both an inside wall at the sealed end of the can 1 and the rear surfaces of the tabs 32. Second, the washer 5 is inserted over the connector 41 of the cam member 4 until it fits in the groove 42 of the connector 41. The cam member 4 is then inserted into the can 1 through the open end 12, with the connector 41 extending outside the can 1 at the open end 12. Thereby, the front end 34 of the shaft 31 of the cam follower 3 is received in the hole 47 of the cam portion 43, the tabs 32 of the cam follower 3 are received in the valleys 44 of the cam portion 43, and the washer 5 is fitted in the inside of the can 1 for fixing the foregoing hinge components in the can 1. The retaining protrusions 18 are then bent inwardly so that the open end 12 of the can 1 is partially covered. Finally, the can 1 is inserted into a tubular knuckle of a cover of the folding mobile phone, and the connector 41 is engaged in the main body of the folding mobile phone.

In use when the cover of the folding mobile phone rotates between an open position and a closed position, the can 1 rotates therewith, the cam follower 3 and the washer 5 rotating along with the can 1, while the cam member 4 keeps relatively stationary. Thus the cam member 4 is engaged with the cam follower 3, and forces the cam follower 3 to slide along the grooves 13 in the can 1, thereby allowing the tabs 32 received in the valleys 44 to pass over the peaks 46 of the cam member 4. Therefore, the cover is open, with the tabs 32 mating with the valleys 44, or closed, with the tabs 32 mating with the valleys 44 again. The relative motion between the cam follower 3 and the cam member 4 is guided by way of the front end 34 of the shaft 31 being received in the hole 47 of the cam member 4. Moreover, the engaging surfaces 33 of the tabs 32 smoothly engage with the peaks 46 and the valleys 44 of the cam surface, thus the relative motion is stable and smooth. Furthermore, the cam follower 3 is received in the can 1 by way of the tabs 32 being slidably inserted into the grooves 13 of the can 1, and the cam member 4 is fixed in the can 1 by the washer 5. Therefore, the cam member 4 cannot longitudinally slip or deviate from the rotating axis of the can 1. Additionally, the spring 2 is coiled over the shaft 31, therefore the spring 2 only extends or recedes linearly along the rotating axis.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A hinge assembly comprising:

a spring;

a cam follower having a shaft and at least one tab perpendicularly formed on the shaft;

a cam having a cam portion and a connector extending from the cam portion, at least one peak and at least one valley formed on a cam surface of the cam portion, the connector defining an engaging groove thereon;

a washer defining a hole corresponding to the engaging groove of the connector; and a housing defining an interior space for encasing the spring, the cam follower, the cam, and the washer therein, with the connector of the cam extending outside of the housing, at least one wall of the housing defining a groove therethrough so that the at least one tab of the cam follower is slidably inserted into the groove;

wherein the spring is coiled over the shaft of the cam follower and is compressively engaged against both an inner wall of the housing and a surface of the at least one tab of the cam follower, the at least one tab is received in the at least one valley, the washer is rotatably fined in the engaging groove of the connector of the cam through the hole thereof and is fixed in the housing, and the cam follower is longitudinally slidably engaged with the housing and is rotatably engaged with the cam.

2. The hinge assembly as claimed in claim 1, wherein at least one wall of the housing has at least one retaining protrusion extending from an end thereof, and an end of the housing is partially covered by way of bending the at least one retaining protrusion inwardly.

3. The hinge assembly as claimed in claim 1, wherein the at least one tab is two tabs spaced 180 degrees from one another, and the at least one wall of the housing is two walls defining two grooves corresponding to the tabs.

4. The hinge assembly as claimed in claim 1, wherein the housing is sealed at a first end thereof and is open at a second end thereof.

5. The hinge assembly as claimed in claim 1, wherein the cam portion of the cam defines a hole therethrough, and one end of the shaft of the cam follower is received in the hole for guiding relative motion between the cam follower and the cam.

6. The hinge assembly as claimed in claim 1, wherein the connector of the cam has a polygonal shape.

* * * * *